US012691790B2

(12) United States Patent
Tu et al.

(10) Patent No.: US 12,691,790 B2
(45) Date of Patent: Jul. 28, 2026

(54) POWER BATTERY PACK EQUALIZATION METHOD BASED ON TERRAIN PREDICTION

(71) Applicant: Xiamen Yaxon Zhilian Technology Co., Ltd., Xiamen (CN)

(72) Inventors: Yankai Tu, Xiamen (CN); Xuhui Ye, Xiamen (CN); Tengyuan Luo, Xiamen (CN)

(73) Assignee: Xiamen Yaxon Zhilian Technology Co., Ltd., Xiamen (CN)

( * ) Notice: Subject to any disclaimer, the term of this patent is extended or adjusted under 35 U.S.C. 154(b) by 650 days.

(21) Appl. No.: 18/254,123

(22) PCT Filed: Jul. 23, 2021

(86) PCT No.: PCT/CN2021/108098
§ 371 (c)(1),
(2) Date: May 23, 2023

(87) PCT Pub. No.: WO2022/110850
PCT Pub. Date: Jun. 2, 2022

(65) Prior Publication Data
US 2024/0001803 A1    Jan. 4, 2024

(30) Foreign Application Priority Data

Nov. 27, 2020    (CN) ......................... 202011362053.X

(51) Int. Cl.
*B60L 58/22*        (2019.01)
*H01M 10/42*        (2006.01)
(Continued)

(52) U.S. Cl.
CPC ........... *B60L 58/22* (2019.02); *H01M 10/425* (2013.01); *H01M 10/4264* (2013.01);
(Continued)

(58) Field of Classification Search
CPC ....................................................... B60L 58/22
(Continued)

(56) References Cited

U.S. PATENT DOCUMENTS

2015/0239365 A1    8/2015  Hyde et al.
2023/0264575 A1*   8/2023  Tu ............................ B60L 7/10
701/22

FOREIGN PATENT DOCUMENTS

CN        102231546 A    11/2011
CN        102361100 A     2/2012
(Continued)

OTHER PUBLICATIONS

Machine Translation of CN108512239, 56 pages (Year: 2018).*
(Continued)

*Primary Examiner* — Nathaniel R Pelton
(74) *Attorney, Agent, or Firm* — COOPER LEGAL GROUP LLC

(57) ABSTRACT

The present disclosure relates to a power battery pack equalization method based on terrain prediction. The method includes: S1. during running of a vehicle, acquiring information of a road ahead of the vehicle; and S2. classifying the road information, setting a power prediction type based on a road information type, and switching a battery pack equalization mode correspondingly. For a low power and high energy recovery type, charging equalization is performed on a battery pack, and single batteries with low power capacity are charged through a supercapacitor; and for a road with high power and high energy consumption, discharging equalization is performed on the battery pack, and the supercapacitor is charged through single batteries with high power capacity. Thanks to the present disclosure, energy distribution and equalization of the entire vehicle can (Continued)

During running of a vehicle, acquire, by a battery management system (BMS), information of a road ahead of the vehicle from an e-horizon system — S1

Classify the road information by the BMS, set a corresponding power prediction type based on a road information type, and then select to switch to a corresponding battery pack equalization mode based on the power prediction type — S2 be more reasonable, the batteries are protected, and better economical efficiency is achieved.

3 Claims, 1 Drawing Sheet

(51) Int. Cl.
   *H01M 10/44*       (2006.01)
   *H02J 7/34*       (2006.01)

(52) U.S. Cl.
   CPC ........... *H01M 10/441* (2013.01); *H02J 7/345* (2013.01); *H01M 2010/4271* (2013.01); *H01M 2220/20* (2013.01)

(58) Field of Classification Search
   USPC .................................................. 320/109, 134
   See application file for complete search history.

(56) References Cited

FOREIGN PATENT DOCUMENTS

| | | | |
|---|---|---|---|
| CN | 103997093 A | | 8/2014 |
| CN | 108512239 | * | 9/2018 |
| CN | 108512239 A | | 9/2018 |
| CN | 108973979 A | | 12/2018 |
| CN | 111976538 A | | 11/2020 |
| KR | 100949260 B1 | | 3/2010 |
| WO | 2007134674 A1 | | 11/2007 |
| WO | 2017027332 A1 | | 2/2017 |

OTHER PUBLICATIONS

International Search Report cited in PCT/CN2021/108098 mailed Oct. 27, 2021, 7 pages.
Written Opinion cited in PCT/CN2021/108098 mailed Oct. 27, 2021, 4 pages.

* cited by examiner

1
POWER BATTERY PACK EQUALIZATION
METHOD BASED ON TERRAIN
PREDICTION

TECHNICAL FIELD

The present disclosure relates to the field of electric vehicles, in particular to a power battery pack equalization method based on terrain prediction.

BACKGROUND

Energy of pure electric vehicles is provided by a battery pack formed by a large number of single batteries through a series of serial/parallel connections. In the process of production, the single batteries have different charging and discharging speeds and internal resistance due to different manufacturing processes, materials, ambient temperatures, etc. The differences are gradually deepened in a charging/discharging cycle of the batteries, which affects the operating efficiency, energy utilization and service life of the batteries, and seriously reduces the performance and range of the electric vehicle. Therefore, in the running process of the electric vehicle, the battery pack needs to be equalized through a battery management system (BMS), single batteries with high power capacity are discharged, and single batteries with low power capacity are charged, so as to prevent a "bucket effect" of the whole power battery pack caused by over-discharging or over-charging of a single battery, thereby preventing damage to the performance of the whole battery pack.

Traditional battery equalization technology may be divided into two categories: passive equalization and active equalization. The passive equalization refers to converting energy of single batteries with excessively high power capacity into heat for consumption by using resistors and other energy consuming devices, which is simple and easy to implement but wastes energy. The active equalization refers to using ordinary capacitors, inductors and other energy storage devices to absorb energy of single batteries with high energy and to charge single batteries with low energy, which is more power-saving than the passive equalization. However, the capacity of the traditional capacitors or inductors is small, so that the equalization capacity is limited, and control is also difficult.

An energy system of a modern pure electric vehicle is generally formed by a battery and a power-assisted supercapacitor. Energy management is required for the battery and the supercapacitor in order to reasonably allocate power output of the battery and the supercapacitor to meet power required for running of the vehicle. In addition, a full play is given to characteristics and advantages of the battery and the supercapacitor to prolong the service life of the battery and reduce energy loss as much as possible. The general principle is to play the advantage of instantaneous high power charging and discharging of the supercapacitor, so as to avoid the impact on a lithium battery caused by instantaneous high current discharging required during vehicle acceleration, thereby prolonging the service life of the battery. When power required by the vehicle is small, power is provided only by the battery; and when the power required by the vehicle is large, the battery provides part of the basic power, and the part beyond is provided by the supercapacitor. When the vehicle brakes, high power energy is first recovered by the supercapacitor with high charging efficiency to avoid damage to the battery by high current charging, and then the energy is recovered by the battery when the supercapacitor is full.

When battery equalization control is performed through the existing BMS, neither the supercapacitor for the power system of new energy vehicles is applied to battery equalization, nor real-time road terrains are taken into account in battery equalization, so that the optimal energy utilization efficiency may not be achieved.

SUMMARY

The present disclosure aims to provide a power battery pack equalization method based on terrain prediction to solve the above problems. Therefore, the specific technical solutions adopted by the present disclosure are as follows:

A power battery pack equalization method based on terrain prediction may include the following steps:

S1. during running of a vehicle, acquiring, by a battery management system (BMS), information of a road ahead of the vehicle from an e-horizon system; and S2. classifying the road information by the BMS, setting a corresponding power prediction type based on a road information type, and then selecting to switch to a corresponding battery pack equalization mode based on the power prediction type, wherein when the power prediction type of the road ahead of a current vehicle position is low power and high energy recovery, charging equalization is performed on the battery pack, and single batteries with low power capacity are charged through a supercapacitor; and when the power prediction type of the road ahead of the current vehicle position is high power and high energy consumption, discharging equalization is performed on the battery pack, and the supercapacitor is charged through single batteries with high power capacity.

Further, step S2 specifically includes:

when the road information type of a slope ahead of the current vehicle position is a steep and long downhill slope, predicting that high energy recovery would occur ahead of the current vehicle position, switching, by the BMS, the battery pack equalization mode to a charging equalization mode, obtaining the maximum single voltage Vmax of all the single batteries by performing voltage detection on the battery pack, and performing, by the supercapacitor, charging equalization on single batteries with single voltages lower than Vmax until an upper voltage limit is Vmax, so that the entire battery pack is equalized; and when the road information type of the slope ahead of the current vehicle position is a steep and long uphill slope, predicting that high energy is needed ahead of the current vehicle position, switching, by the BMS, the battery pack equalization mode to a discharging equalization mode, obtaining the minimum single voltage Vmin of all the single batteries by performing voltage detection on the battery pack, and performing discharging equalization on single batteries with single voltages higher than Vmin until a lower voltage limit is Vmin, so that the entire battery pack is equalized.

Further, before charging equalization is performed, whether power capacity required to charge each of the single batteries to the maximum single voltage Vmax is greater than remaining power capacity of the supercapacitor needs to be determined, if the power capacity required to charge each of the single batteries to the maximum single voltage Vmax is greater than the remaining power capacity of the supercapacitor, a conventional battery equalization method is switched to, otherwise the single batteries with the single voltages lower than Vmax are subjected to charging equalization through the supercapacitor until the single voltages of the single batteries subjected to charging equalization reach Vmax.

Further, before discharging equalization is performed, whether discharging capacity of each of the single batteries discharged to the minimum single voltage Vmin is smaller than remaining charging capacity of the supercapacitor needs to be determined, if the discharging capacity of each of the single batteries discharged to the minimum single voltage Vmin is smaller than the remaining charging capacity of the supercapacitor, a conventional battery equalization method is switched to, otherwise the single batteries with the single voltages higher than Vmin are subjected to discharging equalization and energy of discharging equalization is absorbed by the supercapacitor until the single voltages of the single batteries subjected to discharging equalization reach Vmin.

By the adoption of the above technical solutions, the present disclosure has the following beneficial effects: By combining the supercapacitor with the e-horizon system for battery equalization, the energy distribution and equalization of the entire vehicle are more reasonable, thereby not only protecting the batteries, but also achieving better energy economical efficiency.

BRIEF DESCRIPTION OF DRAWINGS

To further illustrate the embodiments, the present disclosure is provided with accompanying drawings. The accompanying drawings, which constitute a part of the disclosure of the present disclosure, are mainly intended to illustrate the embodiments, and may, together with relevant description of the specification, serve to explain the principles of operation of the embodiments. With these references in mind, a person of ordinary skill in the art will appreciate other possible implementations and advantages of the present disclosure. Elements in the figure are not drawn to scale, and like reference numerals are generally used to indicate like elements.

DESCRIPTION OF EMBODIMENTS

The present disclosure will now be further illustrated with reference to the accompanying drawings and the detailed description.

Figure 1:
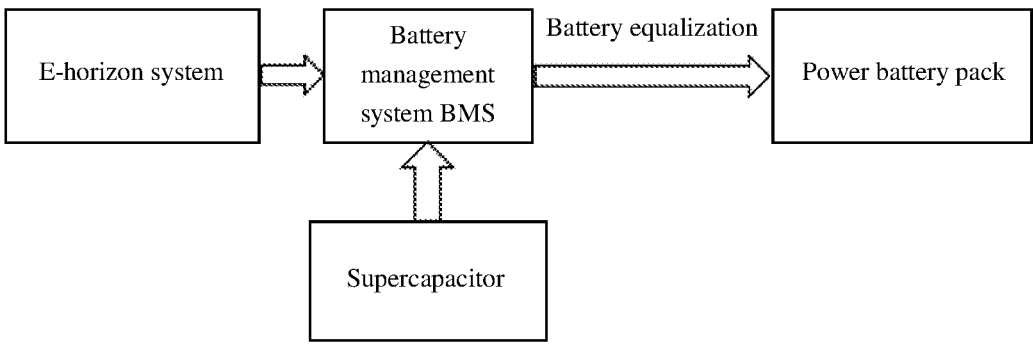
FIG. 1 is a schematic structural diagram of an energy management system for an electric vehicle.

FIG. 1 illustrates a schematic structural diagram of an energy management system for an electric vehicle. The energy management system includes:

an e-horizon system, configured to predict geographic information data ahead and transmit the geographic information data to a battery management system (BMS) based on the standard ADAS IS protocol via a CAN bus or Ethernet bus in the vehicle, so that the BMS may determine the energy consumption situation ahead of the vehicle and control a corresponding battery equalization strategy;

a supercapacitor, configured to charge single batteries that need to be charged in battery equalization, or to discharge single batteries that need to be discharged and store energy, and is also configured to provide the vehicle with high power energy output, or high power energy recovery during braking the electric vehicle;

a power battery pack, formed by a plurality of single batteries connected in series/parallel, and configured to provide power for driving of the vehicle; and a battery management system (BMS): configured to receive data from the e-horizon system. When it is predicted that a road ahead is low power and high energy recovery, the supercapacitor is adopted for charging equalization, and charges single batteries with low power capacity, which may equalize the battery pack, and may also free up an energy storage space for the supercapacitor as much as possible so as to recover more braking energy after the vehicle enters the road requiring high energy recovery ahead. When it is predicted that the road ahead is high power and high energy consumption, discharging equalization is performed, single batteries with high power capacity are discharged, and electric energy is stored in the supercapacitor, so that the energy of the supercapacitor is increased, and the supercapacitor has enough energy to output after the vehicle enters the road requiring high energy consumption ahead, thereby reducing high power deep discharging of the batteries and protecting the power batteries.

Figure 2:
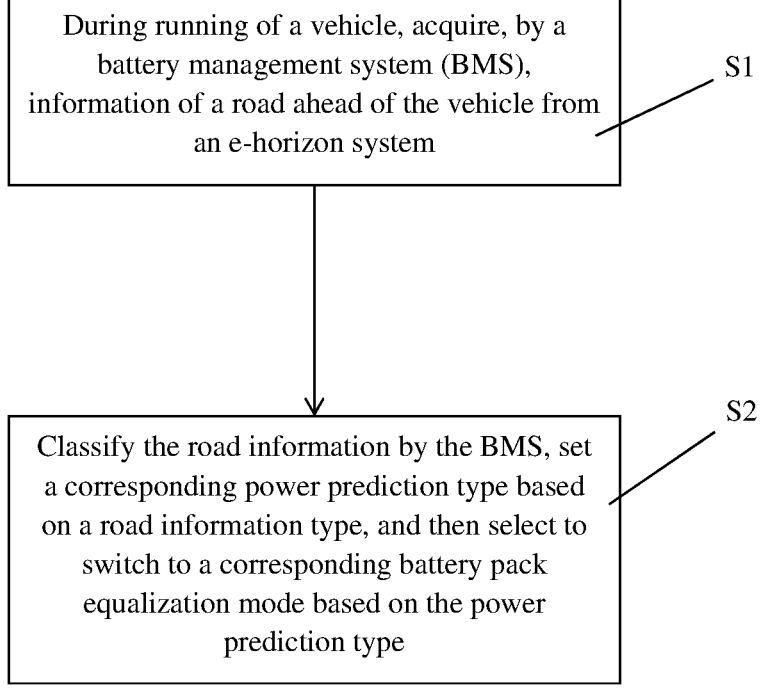
FIG. 2 is a flow diagram of a power battery pack equalization method based on terrain prediction according to the present disclosure.

As shown in FIG. 2, a power battery pack equalization method based on terrain prediction may include the following steps:

S1. During running of a vehicle, acquire, by a battery management system (BMS), information of a road ahead of the vehicle from an e-horizon system, for example, a level road, an uphill or downhill slope, a slope gradient and a slope length. Specifically, whether there is a steep and long downhill slope and a steep and long uphill slope is determined. The definitions of the steep and long downhill slope and the steep and long uphill slope here may refer to the national highway engineering technical standards (for roads of different grades, a slope greater than the specified maximum gentle longitudinal slope is a steep slope), or may be customized based on vehicle performance or actual application needs of users.

S2. Classify the road information by the BMS, set a corresponding power prediction type based on a road information type, and then select to switch to a corresponding battery pack equalization mode based on the power prediction type. When the power prediction type of the road ahead of a current vehicle position is low power and high energy recovery, charging equalization is performed on a battery pack, and single batteries with low power capacity are charged through a supercapacitor. When the power prediction type of the road ahead of the current vehicle position is high power and high energy consumption, discharging equalization is performed on the battery pack, and the supercapacitor is charged through single batteries with high power capacity. The step specifically includes:

when a slope ahead is a steep and long downhill slope, predict that high energy recovery would occur ahead, in this case, switch, by the BMS, a battery pack equalization strategy to a charging equalization mode, obtain the maximum single voltage Vmax of all the single batteries by voltage detection, and perform charging equalization on single batteries with single voltages lower than Vmax until an upper voltage limit is Vmax, so that the entire battery pack is equalized. Since the energy of charging equalization is released by the supercapacitor, when the vehicle enters a terrain with more recoverable energy ahead (the steep and long downhill slope), the supercapacitor has more space to recover electric energy, achieving the economical efficiency of energy utilization.

When the slope ahead is a steep and long uphill slope, predict that high energy is needed ahead, in this case, switch, by the BMS, the battery pack equalization strategy to a discharging equalization mode, obtain the minimum single voltage Vmin of all the single batteries by voltage detection, and perform discharging equalization on single batteries with single voltages higher than Vmin until a lower voltage limit is Vmin, so that the entire battery pack is equalized. Since the energy of discharging equalization is absorbed by the supercapacitor, when the vehicle enters a terrain that needs more energy ahead, the supercapacitor has more stored energy for high power output, which reduces high power discharging of the power batteries and plays a good role in protecting the batteries.

Preferably, before battery equalization is performed, the SOC of the supercapacitor needs to be detected, and then battery equalization is performed based on the SOC of the supercapacitor, so that the supercapacitor is prevented from being overcharged and overdischarged, thereby preventing the service life from being affected. Specifically, before charging equalization is performed, whether power capacity required to charge each of the single batteries to the maximum single voltage Vmax is greater than remaining power capacity of the supercapacitor needs to be determined, if the power capacity required to charge each of the single batteries to the maximum single voltage Vmax is greater than the remaining power capacity of the supercapacitor, a conventional battery equalization method is switched to, otherwise the single batteries with the single voltages lower than Vmax are subjected to charging equalization through the supercapacitor until reaching Vmax. Before discharging equalization is performed, whether discharging capacity of each of the single batteries discharged to the minimum single voltage Vmin is smaller than remaining charging capacity of the supercapacitor needs to be determined, if the discharging capacity of each of the single batteries discharged to the minimum single voltage Vmin is smaller than the remaining charging capacity of the supercapacitor, the conventional battery equalization method is switched to, otherwise the single batteries with the single voltages higher than Vmin are subjected to discharging equalization until reaching Vmin, and energy of discharging equalization is absorbed by the supercapacitor.

While the present disclosure has been particularly illustrated and described with references to the preferred embodiments, it will be understood by a person skilled in the art that all changes in form and details made to the present disclosure without departing from the spirit and scope of the present disclosure as defined by the appended claims fall within the protection scope of the present disclosure.

The invention claimed is:

1. A power battery pack equalization method based on terrain prediction, comprising the following steps:

S1, during running of a vehicle, predicting, by an e-horizon system, geographic information of a terrain that is ahead to generate geographic information data, transmitting, by the e-horizon system, the geographic information data to a battery management system (BMS) based on a standard advanced driver assistance systems (ADAS) interface specification (IS) protocol via a controller area network (CAN) bus or Ethernet bus in the vehicle;

acquiring, by the BMS, the geographic information data corresponding to the geographic information of the terrain that is ahead of the vehicle from the e-horizon system; and S2, classifying the geographic information data by the BMS, setting a corresponding power prediction type based on a road information type, and then selecting to switch to a corresponding battery pack equalization mode based on the corresponding power prediction type, wherein when the corresponding power prediction type of a road ahead of a current vehicle position is low power and high energy recovery, charging equalization is performed on a corresponding battery pack, and single batteries with low power capacity are charged through a supercapacitor; and when the corresponding power prediction type of the road ahead of the current vehicle position is high power and high energy consumption, discharging equalization is performed on the corresponding battery pack, and the supercapacitor is charged through single batteries with high power capacity;

wherein the step S2 comprises:

when the road information type of a slope ahead of the current vehicle position is a downhill slope, predicting that energy recovery will occur ahead of the current vehicle position, switching, by the BMS, the corresponding battery pack equalization mode to a charging equalization mode, obtaining a maximum single voltage (Vmax) of all the single batteries by performing voltage detection on the corresponding battery pack, and performing, by the supercapacitor, the charging equalization on single batteries with single voltages lower than the Vmax until an upper voltage limit is the Vmax, so that an entire battery pack is equalized; and when the road information type of the slope ahead of the current vehicle position is an uphill slope, predicting that energy is needed ahead of the current vehicle position, switching, by the BMS, the corresponding battery pack equalization mode to a discharging equalization mode, obtaining a minimum single voltage (Vmin) of all the single batteries by performing the voltage detection on the corresponding battery pack, and performing the discharging equalization on single batteries with single voltages higher than the Vmin until a lower voltage limit is the Vmin, so that the entire battery pack is equalized; and wherein before the step S2, detecting a system on chip (SoC) of the supercapacitor.

2. The method according to claim 1, wherein before the charging equalization is performed, determining whether power capacity required to charge each of the single batteries to the Vmax is greater than remaining power capacity of the supercapacitor, when the power capacity required to charge each of the single batteries to the Vmax is greater than the remaining power capacity of the supercapacitor, switching to a conventional battery equalization method, otherwise the single batteries with the single voltages lower than the Vmax are subjected to the charging equalization through the supercapacitor until the single voltages of the single batteries subjected to the charging equalization reach the Vmax.

3. The method according to claim 1, wherein before the discharging equalization is performed, determining whether discharging capacity of each of the single batteries discharged to the Vmin is smaller than remaining charging capacity of the supercapacitor, when the discharging capacity of each of the single batteries discharged to the Vmin is smaller than the remaining charging capacity of the supercapacitor, switching to a conventional battery equalization method, otherwise the single batteries with the single voltages higher than the Vmin are subjected to the discharging equalization and energy of the discharging equalization is absorbed by the supercapacitor until the single voltages of the single batteries subjected to the discharging equalization reach the Vmin.

* * * * *